(12) United States Patent
Funatsu et al.

(10) Patent No.: US 9,650,278 B2
(45) Date of Patent: May 16, 2017

(54) MANUFACTURING METHOD OF GLASS FORMING BODY AND FORMING DIE

(71) Applicant: ASAHI GLASS COMPANY, LIMITED, Tokyo (JP)

(72) Inventors: Shiro Funatsu, Tokyo (JP); Tomoharu Hayashi, Tokyo (JP); Katsuhiro Suzuki, Tokyo (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/738,046

(22) Filed: Jun. 12, 2015

(65) Prior Publication Data

US 2015/0353410 A1     Dec. 10, 2015

Related U.S. Application Data

(63) Continuation of application No. PCT/JP2013/081675, filed on Nov. 25, 2013.

(30) Foreign Application Priority Data

Dec. 21, 2012 (JP) .................. 2012-279699

(51) Int. Cl.
  *C03B 23/03* (2006.01)
  *C03B 11/08* (2006.01)

(52) U.S. Cl.
  CPC .......... *C03B 23/0302* (2013.01); *C03B 11/08* (2013.01); *C03B 2215/69* (2013.01); *C03B 2215/76* (2013.01); *Y02P 40/57* (2015.11)

(58) Field of Classification Search
  CPC .................. C03B 23/03; C03B 11/08
  (Continued)

(56) References Cited

U.S. PATENT DOCUMENTS 3,819,349 A * 6/1974 Shimizu ................ C03B 29/025
                                                              65/106
6,067,819 A * 5/2000 Tanaka ................ C03B 23/0307
                                                              425/407
(Continued)

FOREIGN PATENT DOCUMENTS

CN         1715224          1/2006
DE    10 2004 021 215       12/2005
(Continued)

OTHER PUBLICATIONS

JP 2011-246308, Maeda Akinobu, machine translation, Dec. 2011.*
(Continued)

*Primary Examiner* — Mark Halpern
(74) *Attorney, Agent, or Firm* — Oblon, McClelland, Maier & Neustadt, L.L.P.

(57) ABSTRACT

The present invention provides a manufacturing method of glass formed body and a forming die which make it possible to sufficiently fill a glass material in the forming die and manufacture a glass formed body having a desired shape. The manufacturing method of glass formed body includes: heating a plate-shaped glass material; pressing the heated plate-shaped glass material by the forming die; and cooling and solidifying the glass material transferred shapes of forming surfaces of the forming die by the pressing, wherein planar-view contour shapes of the forming surfaces are non-circular, a gap formed by the forming surfaces is formed so as to become wider from an inner side toward an outer side of the forming surfaces, and pressure distribution occurring in the plate-shaped glass material in the pressing is uniform in a contour region of each of the forming surfaces.

11 Claims, 6 Drawing Sheets

(58) Field of Classification Search
USPC .......................................................... 65/61
See application file for complete search history.

(56) References Cited

U.S. PATENT DOCUMENTS

| | | | | |
|---|---|---|---|---|
| 6,539,750 | B1 * | 4/2003 | Takagi | .................. C03B 11/082 65/355 |
| 7,984,626 | B2 | 7/2011 | Tanaka et al. | |
| 2003/0056545 | A1 * | 3/2003 | Murakoshi | ............ C03B 11/005 65/319 |
| 2005/0249919 | A1 | 11/2005 | Wolfing et al. | |
| 2006/0250698 | A1 | 11/2006 | Ogura et al. | |
| 2010/0127420 | A1 | 5/2010 | Dannoux | |

FOREIGN PATENT DOCUMENTS

| | | |
|---|---|---|
| EP | 1 593 656 | 11/2005 |
| JP | 2004-067423 | 3/2004 |
| JP | 2005-320232 | 11/2005 |
| JP | 2010-285308 | 12/2010 |
| JP | 2011-068506 | 4/2011 |
| JP | 2011-201739 | 10/2011 |
| JP | 2011-246308 | 12/2011 |
| KR | 10-1023891 B1 | 3/2011 |
| TW | B 00I387564 | 4/1994 |
| WO | WO 2007/086558 | 8/2007 |
| WO | WO 2010/065371 | 6/2010 |

OTHER PUBLICATIONS

JP 2010-285308, Ichijo Minoru, machine translation, Dec. 2010.*
JP 2011-068506, Fukuda Shigeki, machine translation, Apr. 2011.*
English translation of the International Preliminary Report on Patentability and Written Opinion of the International Searching Authority issued Jul. 2, 2015 in PCT/JP2013/081675.
International Search Report issued Feb. 25, 2014 in PCT/JP2013/081675 filed Nov. 25, 2013.
Combined Office Action and Search Report issued Dec. 2, 2016 in Taiwanese Patent Application No. 102147668 (with English translation of categories of cited documents).

* cited by examiner

MANUFACTURING METHOD OF GLASS FORMING BODY AND FORMING DIE

CROSS-REFERENCE TO RELATED APPLICATION

This application is a continuation of prior International Application No. PCT/JP2013/081675, filed on Nov. 25, 2013 which is based upon and claims the benefit of priority from Japanese Patent Application No. 2012-279699 filed on Dec. 21, 2012; the entire contents of all of which are incorporated herein by reference.

FIELD

The present invention relates to a manufacturing method of glass formed body by press forming and a forming die, and in particular, to a manufacturing method of glass formed body which is capable of sufficiently filling glass in a forming die to enable to obtain a glass formed body having a desired shape, and to a forming die used in the manufacturing method.

DISCUSSION OF THE BACKGROUND

In recent years, various methods for manufacturing a press-formed manufacture made of glass by heat-softening a glass material put in a forming die and pressing it have come into use, and they are used in the manufacture of optical elements, glass substrates for information recording mediums, and so on (refer to, for example, JP-A 2004-67423, WO 2007/086558 A1 and WO 2010/065371 A1).

In such a press forming step, during the heat-softening and the pressing of the glass material, the forming die is set to a predetermined temperature and a heating temperature high enough to process the forming material is maintained, and after the forming, the glass material is cooled to be solidified, and finally, is cooled to a 200° C. temperature or lower at which the forming die is not oxidized. Thus, in the manufacture of the glass formed body by the press forming, a shape of the forming die is accurately transferred to the glass material at the time of the pressing, and this glass material is solidified by cooling to maintain the forming shape and is made into a press-formed manufacture having high accuracy of form.

Meanwhile, as electronic products are making a remarkable progress, various portable electronic products have been developed, and their shapes are made smaller and thinner, and as casings of such compact electronic products, casings using materials made of resin, metal, and the like have been known. If the casing of such an electronic product can be a casing made of glass, there is an advantage that the electronic product has an appearance excellent in design and a high quality feeling. Some of the casings made of glass are manufactured by a method such as cutting, polishing, and so on, and their manufacture by press forming is also under investigation.

SUMMARY OF THE INVENTION

The present invention provides a manufacturing method of glass formed body and a forming die which make it possible to sufficiently fill a glass material in the forming die and manufacture a glass formed body having a desired shape. The present invention provides a manufacturing method of glass formed body and a forming die which make it possible to sufficiently fill a glass material in the forming die and manufacture a glass formed body having a desired shape. The manufacturing method of glass formed body includes: heating a plate-shaped glass material; pressing the heated plate-shaped glass material by the forming die; and cooling and solidifying the glass material transferred shapes of forming surfaces of the forming die by the pressing, wherein planar-view contour shapes of the forming surfaces are non-circular, a gap formed by the forming surfaces is formed so as to become wider from an inner side toward an outer side of the forming surfaces, and pressure distribution occurring in the plate-shaped glass material in the pressing is uniform in a contour region of each of the forming surfaces.

BRIEF DESCRIPTION OF THE DRAWINGS

A more complete appreciation of the invention and many of the attendant advantages thereof will be readily obtained as the same becomes better understood by reference to the following the detailed description when considered in connection with the accompanying drawings.

DETAILED DESCRIPTION

Figure 1A:
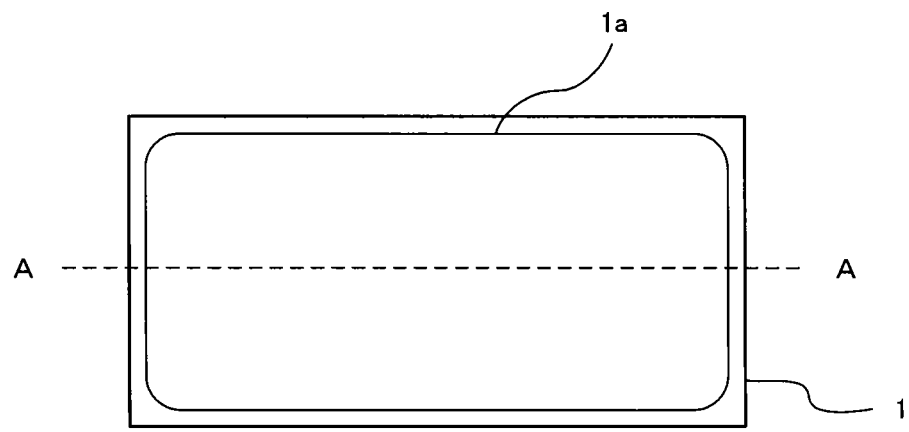
FIG. 1A is a plane view of a glass formed body obtained by a manufacturing method of glass formed body being one embodiment of the present invention.

The embodiments will now be described with reference to the accompanying drawings, wherein like reference numerals designate corresponding or identical elements throughout the various drawings.

Embodiment

Hereinafter, the present invention will be described in detail.

As described above, the manufacturing method of glass formed body of the embodiment of the present invention is a manufacturing method of glass formed body including: heating a plate-shaped glass material placed on a lower die of a forming die having a pair of an upper die and the lower die; pressing the heated plate-shaped glass material by the forming die to transfer shapes of forming surfaces of the forming die; and cooling and solidifying the glass formed body to which the shapes of the forming surfaces are transferred, after the pressing, the method being characterized in a shape of the forming die used at this time.

In the forming die, planar-view contour shapes of the forming surfaces of the upper die and the lower die are non-circular, and a forming surface gap formed by these forming surfaces is formed so as to become wider from an inner side toward an outer side of the forming surfaces.

Here, the planar-view contour shapes of the forming surfaces of the upper die and the lower die refer to their contour shapes on a horizontal plane, and more concretely, are the contour shape of the forming surface in a top view as for the lower die and the contour shape of the forming surface in a bottom view as for the upper die. If the planar-view shapes of the contour shapes of the forming surfaces are non-circular (if the contour shapes are unbalanced no matter how slightly), there is room for improving filling performance of the glass of the present invention, and the contour shapes each may be any other shape except a circular shape which leaves no room for improvement.

Concrete examples of the planar-view contour shape are shapes such as an ellipse and a polygon. Here, examples of the polygon are a triangle, a quadrangle, a pentagon, a hexagon, and higher polygonal shapes, and it may be a regular polygon whose sides all have the same length and whose vertices all have the same angle, or may be a polygon which is not equilateral nor equiangular. For example, taking a quadrangle as an example, it may be a shape such as a square, a rectangle, a parallelogram, or a trapezoid or may be a quadrangle whose sides have different lengths and whose vertices have different angles.

Further, the polygon mentioned here includes a substantial polygon, and here, the substantial polygon also includes, for example, a shape whose vertices of the polygon are each formed to have a curvature, a shape whose vertex portions are cut out by chamfering, and the like, though their basic shapes are a polygon.

As the ellipse, its oblateness is preferably 0.5 or more, and it is also preferable that the polygon is not a regular polygon but has a greatly unbalanced shape. However, as the shape becomes more unbalanced, it is thought that the filling performance of the glass at the time of the forming lowers, and therefore, a shape having at least one axis of line symmetry is preferable, and a shape having many axes of line symmetry is more preferable.

The forming surface gap formed by the forming surfaces of the upper die and the lower die is formed so as to become wider from the inner side toward the outer side of the forming surfaces. If the forming die is thus formed, when the plate-shaped glass material being a forming material is pressed by the upper die and the lower die, a pressure of the inner side first becomes high on the forming surfaces and the glass material is filled in the forming die while the pressure sequentially moves toward the outer side, and consequently, the plate-shaped glass material is pushed out from the inner side toward the outer side up to outer peripheral portions of the forming surfaces without flowing back from the inner side.

Such filling less likely causes problems that the pressure is not applied sufficiently to some portion halfway and the pressure on the outer side first becomes high and gas has no escape place and is trapped, and makes it possible to effectively suppress the occurrence of a defective shape such as the remaining of an insufficiently filled portion or air bubbles.

Here, the forming surface gap refers to a gap formed between the upper die and the lower die when they are completely pushed in the pressing step. A distance of the gap at this time is represented by a distance at a desired point of one of the forming surfaces (manufacture surface side) up to a point where a straight line extending in parallel to a pressing direction intersects with the other forming surface (for example, G1 and G2 in FIG. 3). That is, it is a distance between the forming surfaces of the upper die and the lower die on a vertical line. At this time, the distance of this gap becomes wider from the inner side toward the outer side in a plane view, but this relation only needs to be satisfied up to the smaller forming surface out of the contour shapes of the upper die and the lower die. Such a structure makes it possible to sufficiently fill the glass material at least up to outer peripheral portion of the portion with the small contour shape of the forming surface, causing no defective shape.

Incidentally, a place at which the filling is first performed and which comes to have a high pressure when pressed by the upper die and the lower die is preferably the deepest portion in the forming die for forming a convex surface side of the formed manufacture (forming die having a concave forming surface), and then this is a portion where the gap formed by the upper die and the lower die has the shortest distance. The portion where the gap has the shortest distance may be either a point or a line. The upper die and the lower die are formed so that the distance of the gap gradually becomes wider from there toward an outer peripheral side. Further, in the pressing step, the pressing is performed so that pressure distribution occurring in the plate-shaped glass material becomes uniform in a contour region of each of the forming surfaces. That is, they are formed so that a substantially uniform pressure is applied on a certain contour region, and are formed so that the shapes of the pressure distribution and the contour region substantially agree with each other. This contour region is a region formed with a certain width in a portion basically having a similar shape to or an off-set shape from the planar-view contour shape, on the inner side of the forming surface in a plane view. It is possible to achieve making the pressure distribution applied to the glass material in this contour region the similar shape, by adjusting a widening degree of the gap between the forming surfaces from the inner side toward the outer side, according to the contour shape of the forming surface.

Figure 1B:
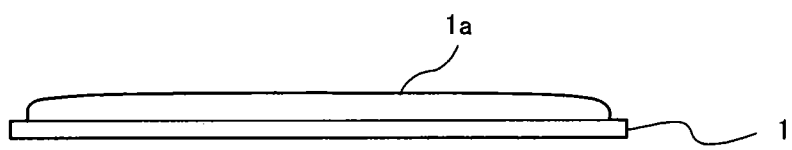
FIG. 1B is a front view of the glass formed body in FIG. 1A.
Figure 1C:
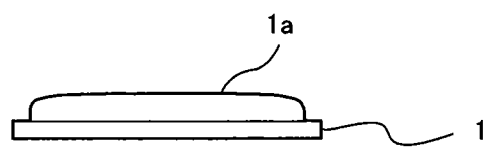
FIG. 1C is a side view of the glass formed body in FIG. 1A.

Hereinafter, a more concrete description will be given, taking, as an example, a case where the glass formed body having the shape illustrated in FIG. 1A to FIG. 1C is manufactured.

FIG. 1A illustrates a plane view of the glass formed body 1 manufactured by the manufacturing method of glass formed body of the embodiment, FIG. 1B illustrates a front view of the glass formed body 1, and FIG. 1C illustrates a right side view of the glass formed body 1. A planar-view contour shape of this glass formed body 1 has a rectangle as a base and a transfer surface 1a in a substantially rectangular shape formed to have a curvature at its vertices, and this contour shape is symmetrical with respect to its major axis and its minor axis. Further, this transfer surface 1a is a transfer surface having a sectional shape formed by a curve whose curvature in a center portion is small and whose curvature becomes larger near an outer peripheral portion. That is, this transfer surface 1a is formed in a curved surface shape, with the deepest portion of the forming surface of the forming die being transferred to its center portion of the rectangle.

To manufacture such a glass formed body, a forming die having forming surfaces which can form the shape of the transfer surface by transfer is used. That is, the transfer surface 1a of the glass formed body 1 and the forming surface of the forming die for forming the transfer surface 1a have the same characteristics regarding the above-described curvature, symmetry, and so on, though their convexity/concavity are opposite.

Figure 2:
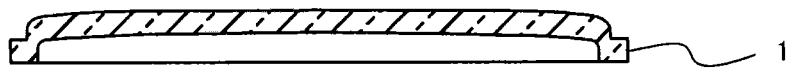
FIG. 2 is an A-A sectional view of the glass formed body illustrated in FIG. 1A.

An A-A sectional view of the glass formed body 1 illustrated in FIG. 1A to FIG. 1C is illustrated in FIG. 2, and as illustrated here, a bottom surface side of this glass formed body 1 is formed as a concave surface. This concave surface is obtained by the forming die whose gap between the upper die and the lower die becomes wider toward the outer side as described above, and therefore, the glass formed body 1 is also formed so that its thickness is smallest at its center portion and becomes larger toward the outer side.

Figure 3:
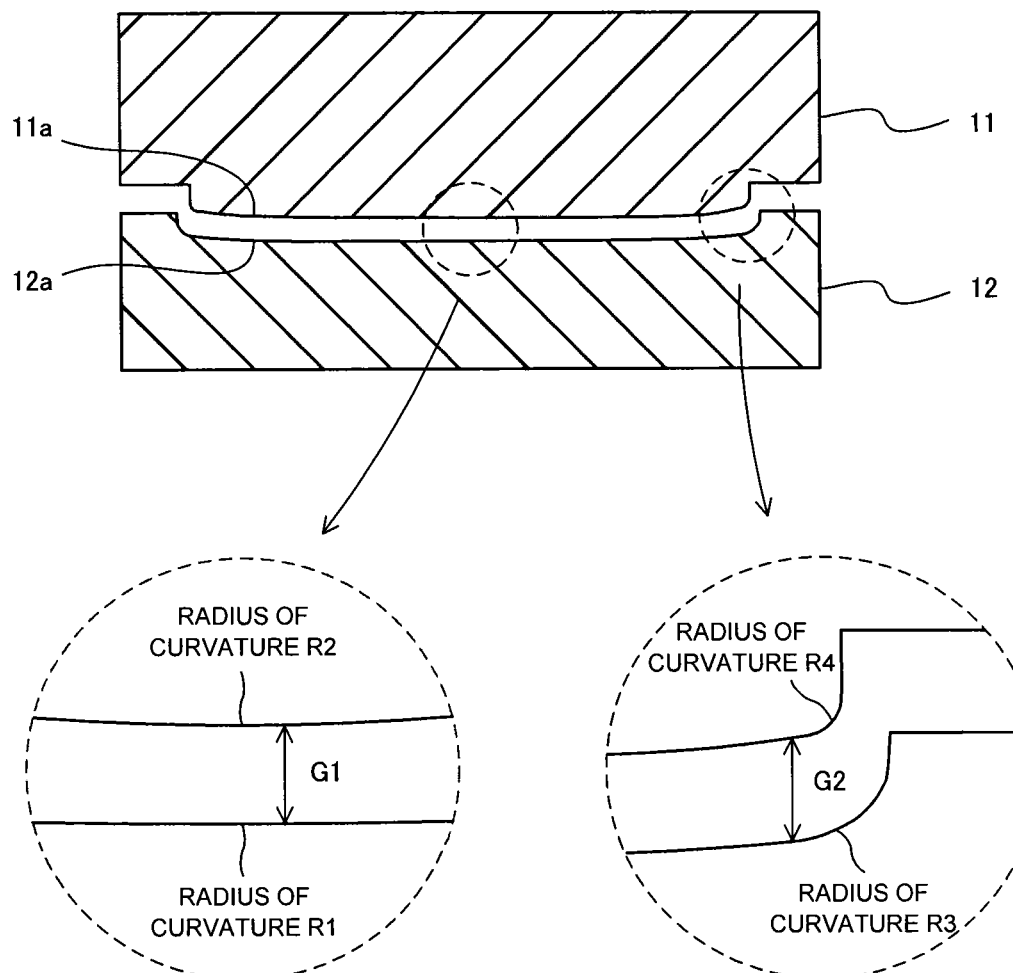
FIG. 3 is a schematic sectional view of a forming die for manufacturing the glass formed body illustrated in FIGS. 1A to 1C.

Here, FIG. 3 illustrates a schematic sectional view of the forming die for manufacturing the glass formed body 1. This forming die is composed of a pair of an upper die 11 and a lower die 12. Here, an example is illustrated where, in manufacturing the glass formed body 1, the convex-side surface (manufacture surface) of the glass formed body 1 faces downward for the forming operation during the manufacturing. Incidentally, enlarged views of a center portion and an outer peripheral portion of forming surfaces of the forming die are also illustrated.

Here, the manufacture surface has a shape decided according to its use and this is a prescribed shape, and therefore, a forming surface 12a of the lower die 12 is decided according to this shape. On the other hand, in order to achieve good filling performance of the glass to form this shape with high yields, the embodiment is characterized in that a shape of a forming surface 11a of the upper die 11 is a required shape so that the gap formed by the forming surfaces becomes wider from the inner side toward the outer side.

In the forming die illustrated in FIG. 3, the manufacture surface is formed by a curved surface having a curvature, and concretely, as illustrated in the enlarged view of the center portion of the forming surfaces in FIG. 3, the gap therebetween is formed by the forming surface 12a of the lower die and the forming surface 11a of the upper die. Therefore, by making a radius of curvature R2 of the forming surface 11a of the upper die smaller than a radius of curvature R1 of the forming surface 12a of the lower die, it is possible for the distance of this gap to become wider toward the outer side.

This characteristic is preferably satisfied along the whole forming surface, and in this case, even when the radius of curvature changes in the middle of the forming surface, the forming surface of the other die is formed so that this relation can be continuously maintained. Concretely, as illustrated in the enlarged view of the outer peripheral portion of the forming surfaces in FIG. 3, a radius of curvature R4 of the forming surface 11a of the upper die is made smaller than a radius of curvature R3 of the forming surface 12a of the lower die. That is, though the radius of curvature differs between the center portion and the outer peripheral portion in the glass formed body 1, the corresponding radius of curvature is decided according to the change so that the gap constantly becomes wider. Note that the aforesaid whole forming surface refers to the whole forming surface whose planar-view contour shape is smaller out of those of the upper die and the lower die. This is because a large difference between sizes of the forming surfaces of the upper die and the lower die makes it difficult to continuously maintain the predetermined relation of the gap along the whole forming surface whose contour shape is larger, even though the above relation of the gap is preferably satisfied along the whole forming surface having the large contour shaper. Therefore, the aforesaid relation only needs to be satisfied at least along the whole forming surface whose contour shape is smaller, and is preferably satisfied along the whole forming surface whose contour shape is larger.

At this time, a shape in which a ratio of the radius of curvature R1 of the forming surface 12a of the lower die and the radius of curvature R2 of the forming surface 11a of the upper die (R2/R1) satisfies a relation of $0.8 \leq R2/R1 < 1.0$ is preferable.

Further, shapes of many forming surfaces are formed as free-form surfaces whose curvature is not constant and a shape satisfying the aforesaid relation even when the radius of curvature changes is preferable. Therefore, a shape in which, near the outer periphery as well, a ratio of the radius of curvature R3 of the forming surface 12a of the lower die and the radius of curvature R4 of the forming surface 11a of the upper die (R4/R3) satisfies a relation of $0.8 \leq R4/R3 < 1.0$ is preferable. However, when the radius of curvature greatly changes in the forming surface or when the radius of curvature becomes small such as 2 mm or less, the ratio may fall out of the relation, and in this case, the shape is designed so that the glass material smoothly flows.

Specifically, when the forming surfaces of the upper die 11 and the lower die 12 are formed so that such a ratio of the radii of curvature is satisfied, the increase of the pressure applied to the plate-shaped glass material occurs gradually from the center portion toward the outer side, and a reverse phenomenon that the pressure increase occurs from the outer side toward the inner side does not occur. Consequently, a stable glass flow from the inner side toward the outer side of the forming surfaces is constantly generated, which can realize good filling performance of the glass and suppress the occurrence of the defective shape.

Further, by making the distribution of the pressure applied to the plate-shaped glass material at this time have a similar shape to the planar-view contour shape of the forming surface, it is possible to suppress unbalancing of the pressure to stably form the shape of the formed manufacture. In the contour shape of the forming surface illustrated in FIG. 1A to FIG. 1C, if the contour shape is symmetrical with respect to the major axis and the minor axis, the distance of the gap is changed from the center portion as a starting point, with a substantially equal rate of change in respective directions.

Further, depending on the shape, a case where the deepest portion of the forming surface of the forming die is not the center but is deviated therefrom can be conceived, and in this case, the shape is adjusted according to a distance from the deepest portion up to the contour of the forming surface so that up to the contour portion, the rate of change is equal in the respective directions. This makes it possible to make the pressure distribution have the similar shape to the planar-view contour shape. Note that the similar shape in the present description allows a deviation from the similar shape. This is because it is difficult to make the shape of the pressure distribution completely the similar shape, and in order to exhibit the effect of the embodiment, it is only necessary that the pressure increase can occur gradually from the inner side toward the outer side. Note that the deviation from the similar shape allows, for example, the simplification of the shape such as rounding of corners of the planar-view contour shape.

Next, with reference to FIG. 4A to FIG. 4D, the manufacturing method of glass formed body of the embodiment will be described. FIG. 4A to FIG. 4D illustrate a method of manufacturing the glass formed body 1 by using the forming die illustrated in FIG. 3.

Figure 4A:
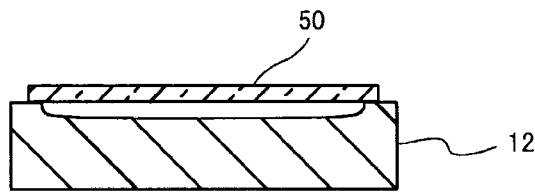
FIG. 4A is a view when a plate-shaped glass material is placed on a lower die in the manufacturing method of glass formed body being the embodiment of the present invention.

First, the heating step in the manufacturing method of glass formed body of the embodiment will be described. As the preparation before the heating step, a plate-shaped glass material 50 is placed on the forming surface of the lower die 12 (FIG. 4A).

Note that, as the glass material 50 used here, a well-known material is usable if it is a glass material applicable to press forming, and it is not particularly limited. Further, the glass material 50 used in the embodiment has a flat plate shape, and only needs to have a size large enough to form the glass formed body by the press forming. In particular, a thickness of this glass material 50 needs to be larger than the maximum value Gmax of the gap formed by the forming surfaces of the upper die 11 and the lower die 12, and is preferably larger than the maximum value Gmax by 0.1 mm or more. Note that the aforesaid maximum value Gmax of the gap is a gap at the outermost peripheral portion (contour portion) of the forming surface having a smaller planar-view contour shape out of the forming surfaces of the upper die and the lower die. Further, two-dimensionally, the glass material 50 preferably has a size large enough to cover the whole forming surface having a larger planar-view contour shape out of the forming surfaces of the upper die and the lower die.

Figure 4B:
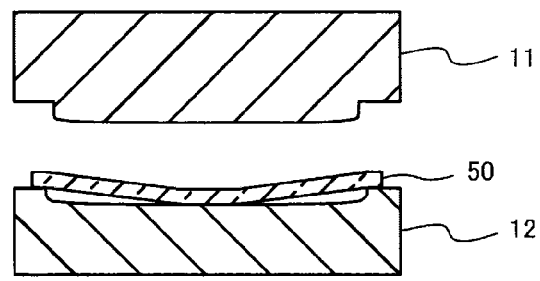
FIG. 4B is an explanatory view of a heating step in the manufacturing method of glass formed body being the embodiment of the present invention.

Next, in order for the plate-shaped glass material 50 placed on the lower die 12 to be deformable, it is heated to a predetermined temperature, and the upper die 11 is disposed above the glass material 50 (FIG. 4B).

This heating is performed by a heating plate having a cartridge heater or the like buried therein so as to be able to heat the lower die 12 by being in contact with the lower die 12 and indirectly heat the plate-shaped glass material 50 by the transfer of this heat. Alternatively, a heater which directly heats the plate-shaped glass material 50 from above to soften it may be provided, and examples of such a heater are heating elements capable of radiation heating such as a cartridge heater, a ceramics heater, a SiC heater, and a carbon heater. These heaters each may be structured, for example, to be buried inside a metal plate of stainless steel, Anviloy, or the like, or inside a glass tube of quartz or the like.

A temperature in this heating step is set so that the glass material 50 can be heated to a temperature range from a temperature of (its deformation point −50° C.) to its melting point. When heated to such a temperature, the glass material 50 can be softened enough to be pressed during a period from the heating step to the pressing step, so that the glass formed body having a desired shape can be obtained. At this time, a heating rate is preferably about 5 to 200° C./minute. Note that the heating temperature is preferably (the deformation point −10° C.) or higher.

Incidentally, FIG. 4B illustrates a case where the glass material 50 is heated to its softening point or higher, and in this case, the glass material 50 deforms due to its own weight and its center portion bends to come into contact with the forming surface 12a of the lower die 12. Incidentally, depending on the heating temperature, the glass material 50 maintains its shape and does not come into contact with the forming surface 12a.

Figure 4C:
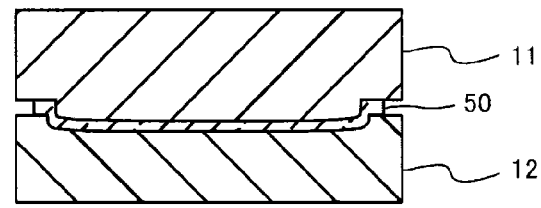
FIG. 4C is an explanatory view of a pressing step in the manufacturing method of glass formed body being the embodiment of the present invention.
Figure 4D:
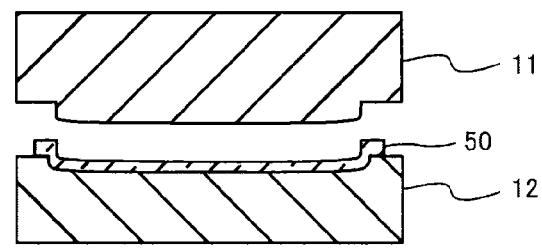
FIG. 4D is an explanatory view of a cooling step in the manufacturing method of glass formed body being the embodiment of the present invention.

Next, the pressing step in the manufacturing method of glass formed body of the embodiment will be described. First, the upper die 11 is disposed above the plate-shaped glass material 50 heated in the above-described heating step. When they come to have a predetermined positional relation, the upper die 11 and the lower die 12 are brought close to each other, so that the plate-shaped glass material 50 placed on the lower die 12 is pressed to be deformed, and the shapes of the forming surfaces that the upper die 11 and the lower die 12 have are transferred to the plate-shaped glass material 50 (FIG. 4C). Since this pressing step is performed while a pressing temperature is maintained, pressing operations of the upper die 11 and the lower die 12 are made to progress simultaneously while they are brought into contact with a pair of upper and lower press plates, respectively, in which cartridge heaters are buried.

Incidentally, in this pressing step, the upper and lower press plates are connected to each of shaft. A cylinder with the shaft makes the press plates movable up and down. The distance between the upper die 11 and the lower die 12 is narrowed by moving up/down both of the upper and lower plates or one of the upper and lower plates being the press plates, it is possible to press the plate-shaped glass material 50 by the forming die. At this time, the pressing is performed with a predetermined pressure, so that the shape of the glass formed body can be given to the plate-shaped glass material with high accuracy. At this time, a pressing direction is a vertical direction.

Further, the pressing in this pressing step is performed at a temperature at which viscosity η of the glass material 50 becomes log η=4 to log η=7, and a temperature of about the softening point is desirable. Further, the pressure applied to the plate-shaped glass material at the time of the pressing is preferably 0.01 kN/mm$^2$ to 2 kN/mm$^2$, and is appropriately decided in consideration of thickness, forming shape, a deformation amount, and so on of the glass material.

Then, in this press forming, since the pressure increase of the glass material 50 gradually occurs from the inner side toward the outer side as described above, the glass is filled sequentially from the inner portion of the forming surfaces to be pushed out toward the outer side, enabling good filling performance.

FIG. 5 illustrate a change of the pressure distribution of the glass material 50 in the pressing step during the above-described press forming.

Figure 5A:
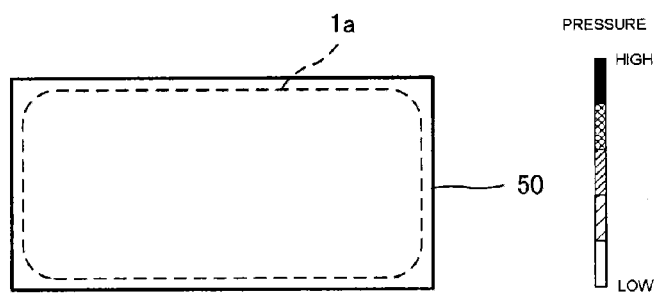
FIGS. 5A-5E are views illustrating a change of pressure distribution of the glass material in the pressing step.
Figure 5B:
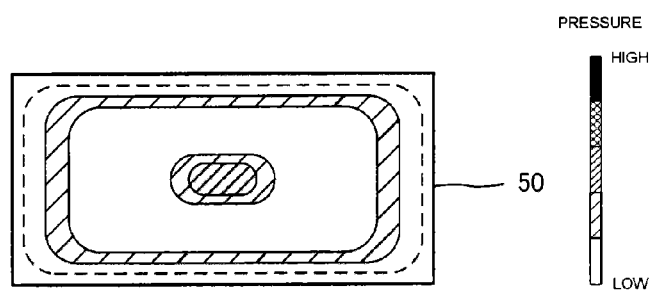
Figure 5C:
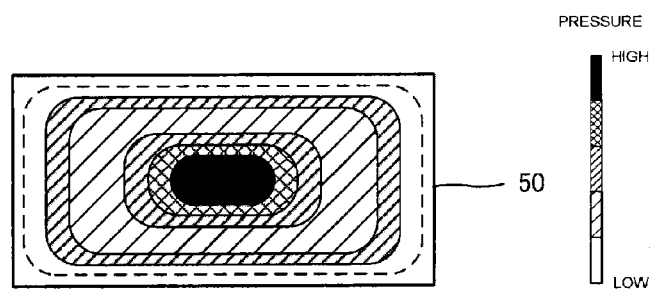

FIG. 5A illustrates a starting stage of the pressing step and a state where the forming surface 11a of the upper die 11 is not yet in contact and the pressure is not applied. Next, in FIG. 5B, the forming surface 11a of the upper die 11 comes into contact with the glass material 50, but here, due to the manufacture shape, a portion first coming into contact is a slightly inner portion than the contour of the forming surface. As the pressing operation further progresses, the pressure is applied to the whole surface of the glass material 50 as illustrated in FIG. 5C, but a portion sandwiched by the upper die 11 and the lower die 12 to be given a large pressure is the center portion where the gap formed by the forming surfaces of the upper die 11 and the lower die 12 is smallest.

Figure 5D:
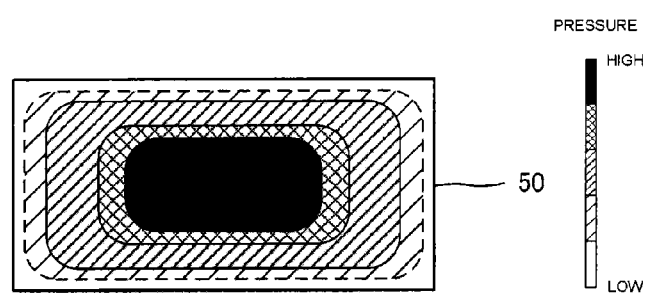
Figure 5E:
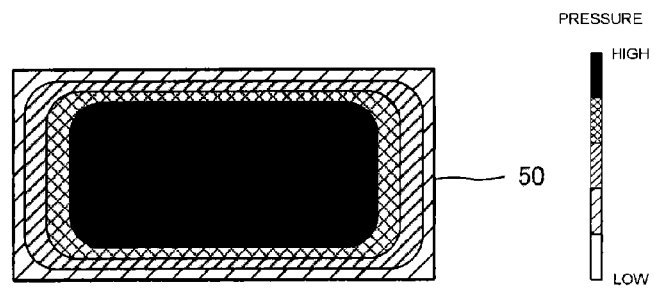

As the pressing operation further progresses, the portion with a high pressure gradually spreads from the center portion toward the outer peripheral side as illustrated in FIGS. 5D and 5E, and finally when the upper die 11 and the lower die 12 are brought close to predetermined positions to be completely pushed, the whole forming surface is sufficiently pressed by the upper die 11 and the lower die 12 (the glass material is filled in the gap between the forming surfaces), which enables to transfer a desired shape of the glass formed body. As illustrated in the explanation of FIGS. 5A to 5E, the pressure distribution has a similar shape to the planar-view contour shape, and for example, pressure regions formed by a difference in this pressure almost agree with the above-described contour regions.

Then, when the shape transfer in the pressing step is finished, the temperature of the upper die 11 and the lower die 12 is decreased so that the formed glass material 50 is released from the upper die 11. To release the glass material 50 from the upper die 11, the temperature of the used glass material 50 is decreased to a temperature lower than its deformation point, and the temperature of the upper die 11 is also decreased to an about the same temperature, and by mainly using a difference in shrinkage percentage between the upper die 11 and the glass material 50, the glass material 50 is released. Alternatively, a mechanism for forcibly releasing it may be provided.

In order to cool and solidify the glass material 50 given the shape of the glass formed body, the cooling step of the embodiment cools the lower die 12 by bringing a cooling plate in which a cartridge heater is buried into contact with the lower die 12 or the like having undergone the pressing process, and further indirectly cools also the glass material 50 placed on the lower die 12. In some case, a cooling rate becomes too high because an upper portion of the glass formed body placed on the lower die 12 on the cooling plate becomes in an open state, and therefore, a heating source such as the heater described in the heating step may be provided above the glass material 50 to control the cooling rate of the glass simple substance.

For the solidification of the plate-shaped glass material 50, the plate-shaped glass material 50 only needs to be cooled to a glass transition point of the material or lower, more preferably, to its strain point or lower, and sufficient cooling stabilizes a glass casing shape of the plate-shaped glass material to suppress its deformation. Here, the cooling refers to a temperature at which the plate-shaped glass material 50 is solidified so as to be stably given the glass casing shape, and this temperature is lower than the temperature of the pressing step only by about 50 to 150° C. and is still high, and therefore a heater is buried into also the cooling plate used in the cooling step. A cooling rate in this cooing is preferably about 5 to 150° C./minute.

The manufacturing method of glass formed body may be a method which performs each of the heating, pressing, and cooling processes at one position, or may be a method of performing the press forming while carrying the forming die, that is, a method which prepares one position or more for each of the steps and performs a predetermined process while the temperature is increased/decreased at each of the positions.

Incidentally, in each of the above-described heating step and cooling step, the temperature is preferably changed in stages. In the heating step, the temperature of the plate-shaped glass material is increased in stages, and immediately before the pressing step, it is heated to the forming temperature. Further, in the cooling step as well, the temperature of the plate-shaped glass material is decreased in stages down to a 200° C. temperature or lower. Such heating and cooling in stages can suppress a rapid temperature change of the plate-shaped glass material, suppress the occurrence of a crack, and prevent deterioration of characteristics of the glass formed body such as the occurrence of strain.

When, in the manufacturing of the glass formed body, for example, the heating step is divided into three stages and the cooling step is divided into three stages to perform the heating and the cooling in stages, in the first heating step, preliminary heating is performed which once heats the plate-shaped glass material to the glass transition point or lower, preferably, to a temperature lower than the glass transition point by about 50 to 200° C., in the second heating step, the plate-shaped glass material is heated to a temperature between the glass transition point and the deformation point, and in the third heating step, it is heated to the deformation point of the glass or higher, preferably, to the softening point or a temperature higher than the softening point by about 5 to 150° C.

Further, in the pressing step, the shape of the glass formed body is given by the forming operation by the forming die while the forming temperature is maintained, in the first cooling step, the glass material is cooled to the glass transition point or lower, preferably, to the strain point or lower, in the second cooling step, it is further cooled to a 200° C. temperature or lower at which the forming die is not oxidized, and in the third cooling step, it is cooled to room temperature.

Here, the third cooling step is capable of efficient cooling when, as the plate brought into contact with the lower die 12, a water-cooled plate in which a pipe is provided so that cooling water circulates is used instead of the heater in the other steps.

As described above, the glass material 50 is formed into the desired shape of the glass formed body after undergoing a series of operations including the heating, pressing, and cooling processes. Consequently, it is possible to sufficiently fill the glass material in the gap formed by the upper die 11 and the lower die 12 at the time of the pressing to obtain the glass formed body having the desired shape with good yields.

Figure 6:
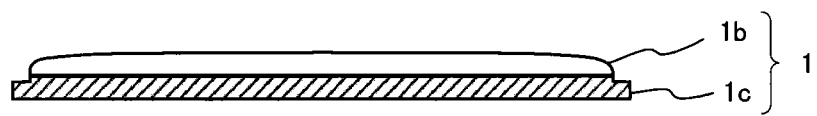
FIG. 6 is an explanatory view of a machining step in the manufacturing method of glass formed body being the embodiment of the present invention.

Further, by thereafter performing a machining step for trimming such as cutting-off, cutting, and polishing to give a desired manufacture shape to the obtained glass formed body, it is possible to obtain the final manufacture. For example, as illustrated in FIG. 6, a machining region 1c, which is hatched, on a bottom surface side of the glass formed body 1 is removed by the trimming process, so that the shape of a manufacture 1b is obtained.

EXAMPLES

Hereinafter, the present invention will be described in more detail by means of examples.

Example 1

Figure 7:
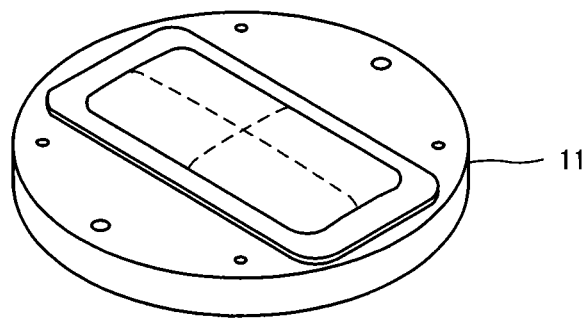
FIG. 7 is a perspective view of an upper die illustrated in FIG. 3 seen from a forming surface side.

Press forming was performed as follows by using the forming die illustrated in FIG. 3. Note that, here, as an upper die, the upper die 11 having the forming surface shape illustrated in FIG. 7 was used. In this forming die, the shape of the substantial rectangle being the manufacture forming surface has a 57 mm major axis and a 28 mm minor axis, and the radius of curvature R1 of the forming surface is 1180 mm, R2 is 1080 mm, R3 is 4 mm, and R4 is 2 mm. Further, the maximum value Gmax of the gap is 3 mm. Here, Gmax is a gap from the outermost periphery of the forming surface of the upper die 11 to the lower die 12. Further, the gap at the center portion with the minimum value is 2 mm.

First, a glass material 50 with a 170 mm long side, a 90 mm short side, and a 4 mm thickness made of soda lime glass was placed on the lower die 12, the glass material was softened by being heated to a temperature at which its viscosity became log η=5, and the upper die 11 was moved down to be pressed with a 20 kN pressing load (1.3 N/mm² pressure), whereby the shape of the forming surface was transferred to the glass material 50. After the transfer was finished, the load was set to 2 kN (0.13 N/mm² pressure), the glass material 50 was cooled at a cooling rate of 100° C./minute while the pressure was kept applied, until the temperature became the strain point of the glass material 50 or lower, and thereafter, it was rapidly cooled to room temperature, whereby a glass formed body was obtained. In the glass formed body, a side to which the forming surface of the upper die 11 was transferred was polished by 1 mm to be worked into a flat surface, whereby the glass formed body as a manufacture was obtained.

Comparative Example 1

Figure 8:
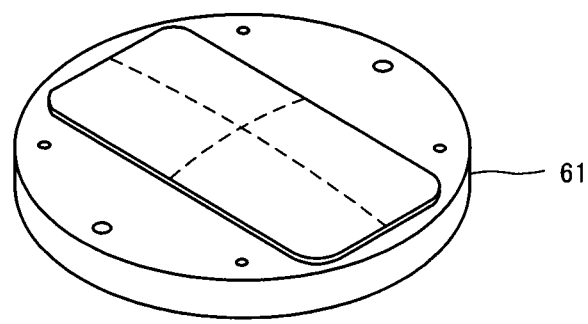
FIG. 8 is a perspective view of an upper die used in a comparative example 1, seen from a forming surface side.

A glass formed body was manufactured with the same operations and conditions as those of the example 1 except that, as an upper die of a forming die, an upper die 61 having a forming surface shape illustrated in FIG. 8 was used. The obtained glass formed body was a defective manufacture having a defective shape due to the air stagnation at four corners of the substantially rectangular forming surface of the lower die 12.

Figure 9:
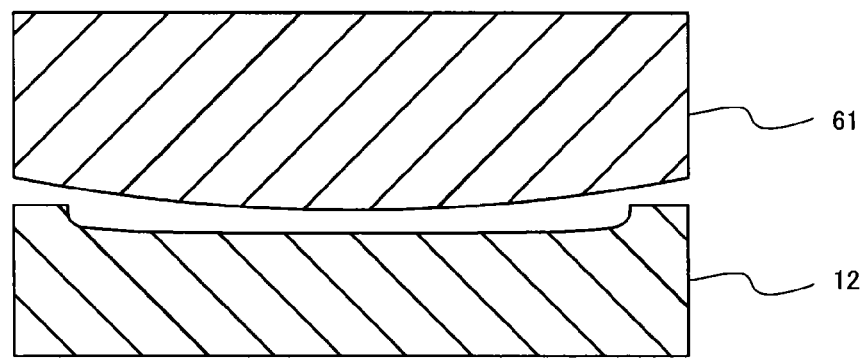
FIG. 9 is a schematic sectional view of a forming die used in the comparative example 1.

A schematic sectional view of the forming die including the upper die 61 used in this comparative example 1 is illustrated in FIG. 9. As is seen from FIG. 9, the forming surface shape of the upper die is formed simply as a single convex surface, and even though sufficient forming is possible on an inner side of the forming surface, centers of radii of curvature of a rising outer peripheral portion of the forming surface of the lower die 12 and the corresponding forming surface shape of the upper die 61 do not coincide with each other, and a gap formed by the respective forming surfaces of the upper die 61 and the lower die 21 is narrow. It is thought that, thus, because the gap becomes narrower from the inner side toward the outer side of the forming surface, the forming die makes an escape route of the such as the air disappear foremost at the outer side of the glass material 50. This results in the remains of the defective shape caused by the air stagnation at the four corners of the forming surface.

As described hitherto, according to the manufacturing method of glass formed body and the forming die of the embodiment of the present invention, since the glass material spreads in the forming die sequentially from the inner side toward the outer side, it is possible to ensure the sufficient filling of the glass material in the forming die without any occurrence of the air stagnation and the like and to effectively suppress the occurrence of the defective shape and the like, which can improve manufacture yields.

According to the manufacturing method of glass formed body and the forming die of the present invention, it is possible to sufficiently fill the glass material in the forming die and to efficiently suppress the occurrence of a defective shape such as insufficient filling and the occurrence of air stagnation. Therefore, it is possible to contribute to an improvement of manufacture yields of the glass formed body to enhance productivity of the manufactures.

The manufacturing method of glass formed body and the forming die of the present invention can be widely used when a glass formed body is manufactured by press forming.

Obviously, numerous modifications and variations of the present invention are possible in light of the above teachings. It is therefore to be understood that within the scope of the appended claims, the invention may be practiced otherwise than as specifically described herein.

What is claimed is:

1. A manufacturing method of a glass formed body, the method comprising:
   heating a plate-shaped glass material placed on a lower die of a forming die having a pair of an upper die and the lower die, wherein each of the upper die and lower die have a forming surface to form the glass formed body;
   pressing the heated plate-shaped glass material by the forming die to transfer shapes of forming surfaces of the forming die; and
   cooling and solidifying the glass material having the transferring shapes of the forming surfaces, after the pressing,
   wherein each of the forming surfaces of the upper die and the lower die has a planar-view counter shape respectively, and each of the planar-view contour shapes is non-circular, a gap between the upper die and the lower die formed by the forming surfaces is formed so as to become wider from an inner side toward an outer side within the smaller planar-view contour shape of the forming surfaces out of those of the upper die and the lower die, and a pressure distribution occurring in the plate-shaped glass material in the pressing thereof is uniform in a contour region of each of the forming surfaces.

2. The manufacturing method of glass formed body according to claim 1, wherein the planar-view contour shapes are each an ellipse or a polygon.

3. The manufacturing method of glass formed body according to claim 1, wherein one of the forming surfaces has a convex surface and the other has a concave surface corresponding to the convex surface.

4. The manufacturing method of glass formed body according to claim 3, wherein a ratio of a radius of curvature R1 and a radius of curvature R2 at corresponding surfaces of the respective concave surface and convex surface (R2/R1) satisfies a relation of 0.8≤R2/R1<1.0.

5. The manufacturing method of glass formed body according to claim 1, wherein a heating temperature in the heating is a temperature lower by 50° C. than a deformation point or higher.

6. The manufacturing method of glass formed body according to claim 5, wherein the heating temperature in the heating is a temperature lower by 10° C. than a deformation point or higher.

7. The manufacturing method of glass formed body according to claim 6, wherein the heating temperature in the heating is a softening point of the plate-shaped glass material or higher.

8. The manufacturing method of glass formed body according to claim 1, wherein the planar-view contour shapes of the forming surfaces each have a major axis and a minor axis perpendicular to the major axis, and the planar-view contour shapes are each in line symmetry with respect to at least one of the major axis and the minor axis.

9. The manufacturing method of glass formed body according to claim 8, wherein a rate of change of the pressure distribution is in line symmetry with respect to at least one of the major axis and the minor axis.

10. The manufacturing method of glass formed body according to claim 1, comprising, after the cooling, removing one of forming surfaces of the obtained glass formed body by cutting or polishing.

11. The manufacturing method of glass formed body according to claim 1, wherein a thickness of the glass material is larger by 0.1 mm or more than a maximum value $G_{max}$ of the gap of the forming surfaces formed by the convex surface and the concave surface when the glass material is completely pressed in the pressing.

* * * * *